3,365,408
ADHESIVES COMPRISING POLYVINYL ALCOHOL BEARING OR MIXED WITH SUBSTANCES BEARING CARBOXYL GROUPS, AND A STABILIZER
Osamu Ohara, Kurashiki, Japan, assignor to Kurashiki Rayon Company Limited, Kurashiki, Japan, a corporation of Japan
No Drawing. Filed Aug. 3, 1964, Ser. No. 387,203
Claims priority, application Japan, Aug. 12, 1963, 38/42,472
7 Claims. (Cl. 260—29.6)

This invention relates to polyvinyl alcohol adhesives which form sufficient water resistant adhesive films by instantaneously heating the additives of metal oxides or metal hydroxides to aqueous solution of derivatives of polyvinyl alcohol (hereinafter abridged as PVA) having carboxyl groups or mixtures of PVA and high molecular weight substances having carboxyl groups.

Considering the water solubility and adhesion, PVA has been used as adhesives in a certain field for many years, but it is well known that the water resistance of PVA is not sufficient. To increase water resistance of PVA and its derivatives, various proposals have heretofore been made. Such proposals, however, were not satisfactory from operative viewpoint because they need heat treatments for long hours, or they had too large initial viscosity.

The inventor discovered that addition of metal oxides or metal hydroxides into aqueous solutions of derivatives of PVA having carboxyl groups or mixtures of PVA and other high molecular weight substances having carboxyl groups increase or decrease the viscosity of the solutions compared with that of aqueous solutions of said high molecular weight substances alone in accordance with the combinations of kinds and quantities of said metal oxides and metal hydroxides, and the adhesion of papers, cloths, etc. was completed in a few seconds if heat treatment was applied at above 100° C. and in several tens of seconds if less than 100° C., and further the adhered film had water resistance.

As the derivatives of PVA having carboxyl groups, saponified products of vinyl acetate-acrylate copolymers, saponified products of vinyl acetate-methacrylate copolymers, saponified products of vinyl acetate-acrylic amide copolymers, saponified products of vinyl acetate-acrylonitrile copolymers, PVA etherified by glycolic acid, PVA acetalized by glyoxylic acid, etc. can be used and their carboxyl group contents should be within the range between 5–70 mol percent.

As high molecular weight substances having carboxyl groups to be mixed with PVA, polyacrylic acid, saponified products of polyacrylic amide, saponified products of polyacrylonitrile, etc. can be used and the carboxyl group contents in the mixtures are preferably within the range between 5–70 mol percent. When the aqueous solution of PVA and that of said high molecular weight substances are mixed, the mixture should be heated for several hours above hot water (about 90° C.), or the mixture should be well mixed by leaving it at room temperature for several hours. The viscosity of said solution of mixture increases to a substantial extent due to the fact that the carboxyl groups of high molecular substances having carboxyl groups and hydroxyl groups of PVA produce hydrogen bonds or ester bonds. However, the addition of oxides or hydroxides of metals of Group II in the Periodic Table of Elements reduces the viscosity of said solution, and at a certain addition quantity the viscosity reaches the minimum. An aqueous solution of oxides or hydroxides of metals of Group II has alkaline property and it has advantage of changing the pH value of the solution at will by adjusting the addition quantity. As for the addition of oxides or hydroxides of metals other than Group II, there are two different groups, one is to give practically no effects on viscosity and the other is to raise the viscosity. For instance, lead sesquioxide and copper oxide belong to the former group, and an aluminum oxide and iron oxide belong to the latter group.

As the oxides or hydroxides to be added, oxides or hydroxides of calcium, magnesium, zinc, lead, copper, aluminum, iron, etc. can be used, and bentonite and clay containing said oxides or hydroxides as their essential components can also be used as equivalent substances.

After said metal oxides or hydroxides are added into solutions of high molecular weight substances, the solution must be stirred until the added substance have been uniformly dispersed. When the viscosity is suddenly increased or partial precipitation occurs upon addition (which often happen with oxides or hydroxides of metals of Group II), restirring after leaving the solution for several hours will produce uniformly dispersed solution. The uniformly dispersed solutions thus produced have excellent stability against storing at room temperature and the change to high temperature range and to low temperature range. The higher the temperature of heat treatment, the shorter is the time for increase of adhesion and water resistance, and they can be used as instantaneous adhesives or water resistant binders.

The invention will now be explained in detail referring to examples.

*Example I*

An aqueous solution containing 5% by weight of PVA (degree of polymerization 1,700, degree of saponification 98 mol percent) and 5% by weight of polyacrylic acid (degree of polymerization 4,600) was heated on hot water bath of 90° C. while stirring for about 1 hour, and added with 2.0% by weight of zinc oxide based on the total solution and after thoroughly dispersed left alone for about 3 hours, and restirred to obtain uniform dispersion. The solution having said composition was poured and spread over a plate of vinyl chloride to obtain a film of 0.05 mm. thick and a part of the film was heat-treated at 120° C. for 3 minutes, while the rest of the film was not heat-treated. The solubilities of said two films after left in water at 20° C. for about a day were measured. For the sake of comparison, the solubility of a film made of PVA alone in water was also measured under the same conditions. The results are shown below.

| | Solubility in water* (percent by weight) | |
|---|---|---|
| | Heat-treated at 120° C. for 3 minutes | Non-heat-treated |
| PVA—polyacrylic acid-zinc oxide film | 34.6 | 90 |
| Film of PVA alone | 100 | 100 |

*The solubility in water is indicated by the degree of dissolution of a dry film when immersed in water expressed in percent by weight.

In order to check the initial adhesion of the solution, a liner for corrugated board of paper was directly connected to a fixed spring balance, a center board applied with the solution at the rate of 0.02 cc./cm.$^2$ was pressed against said liner, heat treatment was done for about 2 seconds between two hot plates (preheated to 120° C.), then only the center board was pulled to measure the maximum force required for breaking the adhered portion by means of said spring balance. The measured value was 1.0 kg. For the sake of comparison, the maximum force required for breaking the adhered portion by the conventionally used stainhole type starch paste for corrugated paper board was measured under the same conditions and the measured value was 0.5 kg.

It was thus proved that the initial adhesion of PVA—polyacrylic acid-zinc oxide adhesives was excellent.

*Example 2*

An aqueous solution containing 8% by weight of PVA (degree of polymerization 1,700, degree of saponification 89 mol percent) and 2% by weight of polyacrylic acid (degree of polymerization 4,600) was heated on a hot water bath at 90° C. for about 1 hour while stirring, and added with 1.5% by weight of calcium oxide based on the total solution, thoroughly stirred, then left alone for 3 hours, and restirred to obtain a uniformly dispersed solution. The viscosity of the solution was as low as about 300 cp. The initial adhesion of the solution was measured in the same manners as Example 1 and obtained the measured value of 1.2 kg. Thus the excellence of the solution was proved.

*Example 3*

An aqueous solution for clay coating having a total solid concentration of 29.8% was prepared by adding 8 parts of PVA etherified by glycolic acid (degree of polymerization 1,700 degree of saponification 98 mol percent) of 10 mol percent into 100 parts of clay. The solution thus obtained was applied on a flat base paper at the rate of 5–7 g./m.², dried at 130° C. for 5 minutes, thereafter applied to a calender (80° C., 100 kg./cm.) 4 times. The clay coating thus obtained was not peeled even after rubbing more than ten times with a wet index finger, whilst the conventionally used starch clay coating was peeled in 1–2 times of rubbing. The excellent wet strength was well proved.

*Example 4*

An aqueous solution containing 11% by weight of PVA (degree of polymerization 1,700, degree of saponification 98 mol percent) and 3% of polyacrylic acid (degree of polymerization 5,000) was stirred while heating (at about 90° C.) for about 1 hour, then added with 0.5% by weight of calcium oxide. As time elapsed while stirring, a uniformly dispersed solution was obtained, and its viscosity decreased as low as about 3,000 cp. The solution was applied to adhesion of two sheets of craft papers, and the adhesive strength after 5 seconds adhesion was measured by using a tension meter of Shopper type made by the Shimazu Manufacturing Co. For the sake of comparison, the adhesive strength of a sample of emulsion of vinyl acetate (48.9% of solid part, 1.22% of free vinyl acetate, viscosity 72,000 cp.) was measured. The results are shown below:

| Kinds of adhesives: | Adhesive strength (width 2 cm. x length 3 cm.) |
|---|---|
| PVA—polyacrylic acid-calcium oxide adhesive, gm | 320 |
| Emulsion of vinyl acetate, gm | 310 |

It is apparent from the above table that the PVA—polyacrylic acid-calcium oxide adhesive was equivalent with the emulsion of vinyl acetate with regard to the adhesive power at room temperature. Accordingly, the solution thus obtained proved to have sufficient adhesive strength for application as adhesive for manufacturing corrugated paper board boxes.

What I claim is:

1. A shelf-stable adhesive composition capable of forming an adhering water resistant film, comprising a uniformly dispersed solution, in water, of (A) a member selected from the group consisting of (a) derivatives of polyvinyl alcohol bearing carboxyl groups and (b) a mixture of polyvinyl alcohol and high molecular weight substances bearing carboxyl groups; and (B) a suspension stabilizing amount of a stabilizer selected from the group consisting of bentonite, clay, metal oxides and metal hydroxides; the said derivatives of polyvinyl alcohol bearing carboxyl groups (a) being selected from the group consisting of saponified products of vinyl acetate-acrylate copolymers, saponified products of vinyl acetate-methacrylate copolymers, saponified products of vinyl acetate-acrylic amide copolymers, saponified products of vinyl acetate-acrylonitrile copolymers, polyvinyl alcohol etherified by glycolic acid and polyvinyl alcohol acetalized by glyoxylic acid; the said mixture of polyvinyl alcohol and high molecular weight substances bearing carboxyl groups (b) being a mixture of polyvinyl alcohol and a member selected from the group consisting of polyacrylic acid, saponified products of polyacrylic amide and saponified products of polyacrylonitrile; and the metal in the metal oxides and metal hydroxides being selected from the group consisting of calcium, magnesium, zinc, lead, copper, aluminum and iron; with the proviso that the carboxyl group content of both of the above (a) and (b) components is in the range of between 5 mol percent and 70 mol percent.

2. The adhesive composition as defined by claim 1, wherein (A) comprises the derivatives of polyvinyl alcohol bearing carboxyl groups (a).

3. The adhesive composition as defined by claim 1, wherein (A) comprises the mixture of polyvinyl alcohol and high molecular weight substances bearing carboxyl groups (b).

4. The adhesive composition as defined by claim 1, wherein the stabilizer is bentonite.

5. The adhesive composition as defined by claim 1, wherein the stabilizer is clay.

6. The adhesive composition as defined by claim 3, wherein the aqueous solution comprises from 5 percent to 11 percent by weight polyvinyl alcohol, from 2 percent to 5 percent by weight polyacrylic acid, and further wherein there is present from 0.5 percent to 2.0 percent by weight of stabilizer.

7. A method for the preparation of a shelf-stable adhesive composition capable of forming an adhering water resistant film, comprising thoroughly agitating an aqueous solution of the member (A) as defined in claim 1, heating the same, adding thereto a suspension stabilizing amount of a stabilizer selected from the group consisting of bentonite, clay, metal oxides and metal hydroxides, the metal in the metal oxides and hydroxides being selected from the group consisting of calcium, magnesium, zinc, lead, copper, aluminum and iron, and thence agitating the resulting mixture until a uniformly dispersed solution is formed.

References Cited

UNITED STATES PATENTS

| 3,084,133 | 4/1963 | Sirota et al. | 260—29.6 |
| 3,234,160 | 2/1966 | Matsubayashi | 260—29.6 |
| 2,227,997 | 1/1941 | Berg | 260—91.3 |
| 2,512,726 | 6/1950 | Penn | 260—91.3 |
| 2,605,259 | 7/1952 | Germain | 260—91.3 |

JOSEPH L. SCHOFER, *Primary Examiner.*

J. F. McNALLY, H. WONG, *Assistant Examiners.*